(12) United States Patent
Sheu et al.

(10) Patent No.: US 8,301,577 B2
(45) Date of Patent: Oct. 30, 2012

(54) INTELLIGENT MONITORING SYSTEM FOR ESTABLISHING RELIABLE BACKGROUND INFORMATION IN A COMPLEX IMAGE ENVIRONMENT

(75) Inventors: Ming-Hwa Sheu, Yunlin County (TW); Wen-Kai Tsai, Yunlin County (TW); Yuan-Chang Chu, Taichung County (TW); Chia-Huan Chen, Yunlin County (TW); Ssu-Ying Chen, Yunlin County (TW)

(73) Assignee: National Yunlin University of Science and Technology, Douliu, Yunlin County (TW)

( * ) Notice: Subject to any disclaimer, the term of this patent is extended or adjusted under 35 U.S.C. 154(b) by 943 days.

(21) Appl. No.: 12/275,382

(22) Filed: Nov. 21, 2008

(65) Prior Publication Data

US 2010/0131442 A1    May 27, 2010

(51) Int. Cl.
*G06F 17/00* (2006.01)
*G06N 5/02* (2006.01)
(52) U.S. Cl. ............................................. 706/46
(58) Field of Classification Search ................. None
See application file for complete search history.

(56) References Cited

U.S. PATENT DOCUMENTS

2007/0273765 A1*  11/2007  Wang et al. .................. 348/152

OTHER PUBLICATIONS

Li et al. "Statistical Modeling of Complex Backgrounds for Foreground Object Detection", IEEE Trans. Image Processing, vol. 13, No. 11, 2004, pp. 1459-1472.*
Spagnolo et al. "Moving object segmentation by background subtraction and temporal analysis", Image and Vision Computing 24 (2006), pp. 411-423.*

* cited by examiner

*Primary Examiner* — Jeffrey A Gaffin
*Assistant Examiner* — Li-Wu Chang
(74) *Attorney, Agent, or Firm* — Muncy, Geissler, Olds & Lowe, PLLC (57) ABSTRACT

An intelligent monitoring system aims to perform object surveillance and tracking, and can quickly build accurate and reliable background data in a complex image condition to achieve desired monitoring result. Based on a dynamic background and a temporary static object and user's requirements, monitoring objects in a background module can be added or deleted to match the actual background information. The whole background data can be tracked according to characteristics of a targeted object set by users, and post-processing can be done for the tracked object, such as zooming, identifying, capturing, surveillance of behaviors, and the like. Thus whether a special attention is needed for a dynamic or static object can be notified. And an alert can be issued to relevant people for timely handling.

12 Claims, 12 Drawing Sheets

INTELLIGENT MONITORING SYSTEM FOR ESTABLISHING RELIABLE BACKGROUND INFORMATION IN A COMPLEX IMAGE ENVIRONMENT

FIELD OF THE INVENTION

The present invention relates to a monitoring system and particularly to an intelligent monitoring system for establishing reliable background information in a complex image environment.

BACKGROUND OF THE INVENTION

Crimes are rampant in many locations and countries nowadays. To attack this problem, monitoring systems are widely set up in recent years in public and private sites. For instance, most railways or high speed trains now adopt computerized automatic driving. In such autopilot public transportation systems, occurrence of obstacles on the routes is the greatest safety concern. Or in some important public sites, such as art galleries, museums, government organizations and the like, to prevent theft or disposing of unknown articles (such as explosives), a lot of manpower has to be deployed to do monitoring, or expensive theft-thwarting equipments have to be installed. To crack down traffic violations on roads, policemen have to drive hauling vehicles to do patrolling. Thus a great deal of human resources and precious time are wasted. An intelligent monitoring system is able to identify selected events and activities such as presence of obstacles, vehicle violations or thefts, and capable of instantly notifying related people or generating alarm would be very helpful.

Conventional monitoring techniques often focus on object image segmentation or tracking, and comparison. System test films mostly adopt academic standard films without taking into account of actual environments. Hence how to establish backgrounds and update background information often are neglected. As an actual background often involves constantly moving objects, there is no idle duration allowing the system to capture the background, or a period of training is needed to generate the background.

Moreover, most conventional techniques do not provide comprehensive exploration on static objects. For instance, National Taiwan University provides a "Background Registration" technique capable of detecting objects. It has a drawback, namely once a judgment is made, a background is saved, the saved background data remains unchanged without updated.

Another conventional technique is Codebook system. It provides background learning and an image detection method. In the event that an object is static, it becomes a background. However, if the static object is an explosive and becomes the background of the monitoring system, the purpose of monitoring is futile.

The two conventional approaches mentioned above still have rooms for improvement, notably: 1. No update of the background does not meet actual requirement; 2. Objects in actual sites are not always dynamic; a neglected static object should be updated to become a background (such as a vehicle parked on a road side, trash dropped on the ground by people, or the like). There are other conventional techniques that can update static objects to become the background. But the update speed is a constraint. As a result, the conventional monitoring systems still leave a lot to be desired.

SUMMARY OF THE INVENTION

Therefore, the primary object of the present invention is to provide an intelligent monitoring system that can update images according to user's setting to judge a dynamic background and a static background.

To achieve the foregoing object, the invention receives at least one input image consisting of a plurality of pixels transmitted from an image capturing unit and performs judgment. It includes a host, an intelligence judgment machine (IJM), a continuous image comparison unit and a time stabilizing unit. The host and the image capturing unit are connected. The IJM and the host are connected. The continuous image comparison unit and the time stabilizing unit are located in the IJM and connected therewith.

As the continuous image comparison unit is located in the IJM and connected therewith, a threshold value $Th\_D$ is provided to be compared with the pixels. After comparison, the time stabilizing unit which contains a plurality of time threshold values gives the pixels a time value. After judgment and comparison are performed, the data of the pixels are sent to a background module, then a segmentation unit and a post-processing unit execute image post-process and monitoring operation, and filter out noises to smooth and complete the image.

Therefore, judgment of the image of an object is performed in conditions in which movement of the object is continuously locked without the object being impacted and staggered. After the object is separated, it is still be tracked continuously. Thus monitoring can be accomplished.

The IJM provides function of processing the input image and judging whether the input image is a static background or a dynamic background, and also judging whether the input image is a dynamic object or a static object by processing the input image through the dynamic background module and the time stabilizing unit. If the object stays for a prolonged duration, an alarm may be issued or operation of update to become background data can be executed according to user's setting requirement.

Thus the IJM can distinguish whether the input image is the static background, dynamic background, dynamic object or static object. The IJM also can be set by users to perform monitoring continuously.

By means of the technique set forth above, the intelligent monitoring system of the invention can provide the following advantages:

1. Reliable background data can be set up quickly and accurately even in a complex and murky condition, and a dynamic background (such as swaying of the tree leaves and water ripples and the like) and a static object (such as trash or explosive) can be monitored and judged. So that swaying of the tree leaves and ripples of water do not affect monitoring quality. In addition, the static object can be differentiated to determine whether to notify relevant people to handle and to further improve monitoring quality and to save manpower and resources.

2. By providing input image background update function, in addition to capable of timely adjusting variations of environment brightness, input image data that require special attention can be flexibly added or deleted according to user's requirement to match actual background information, so that monitoring and post-processing operations can be performed to alert users and monitoring suspected people and articles on the screen, and contingent plans can be established in advance to prevent abnormal conditions from taking place.

The foregoing, as well as additional objects, features and advantages of the invention will be more readily apparent from the following detailed description, which proceeds with reference to the accompanying embodiments and drawings. The embodiments discussed below serve only for illustrative purpose and are not the limitations of the invention.

DETAILED DESCRIPTION OF THE PREFERRED EMBODIMENTS

Figure 1:
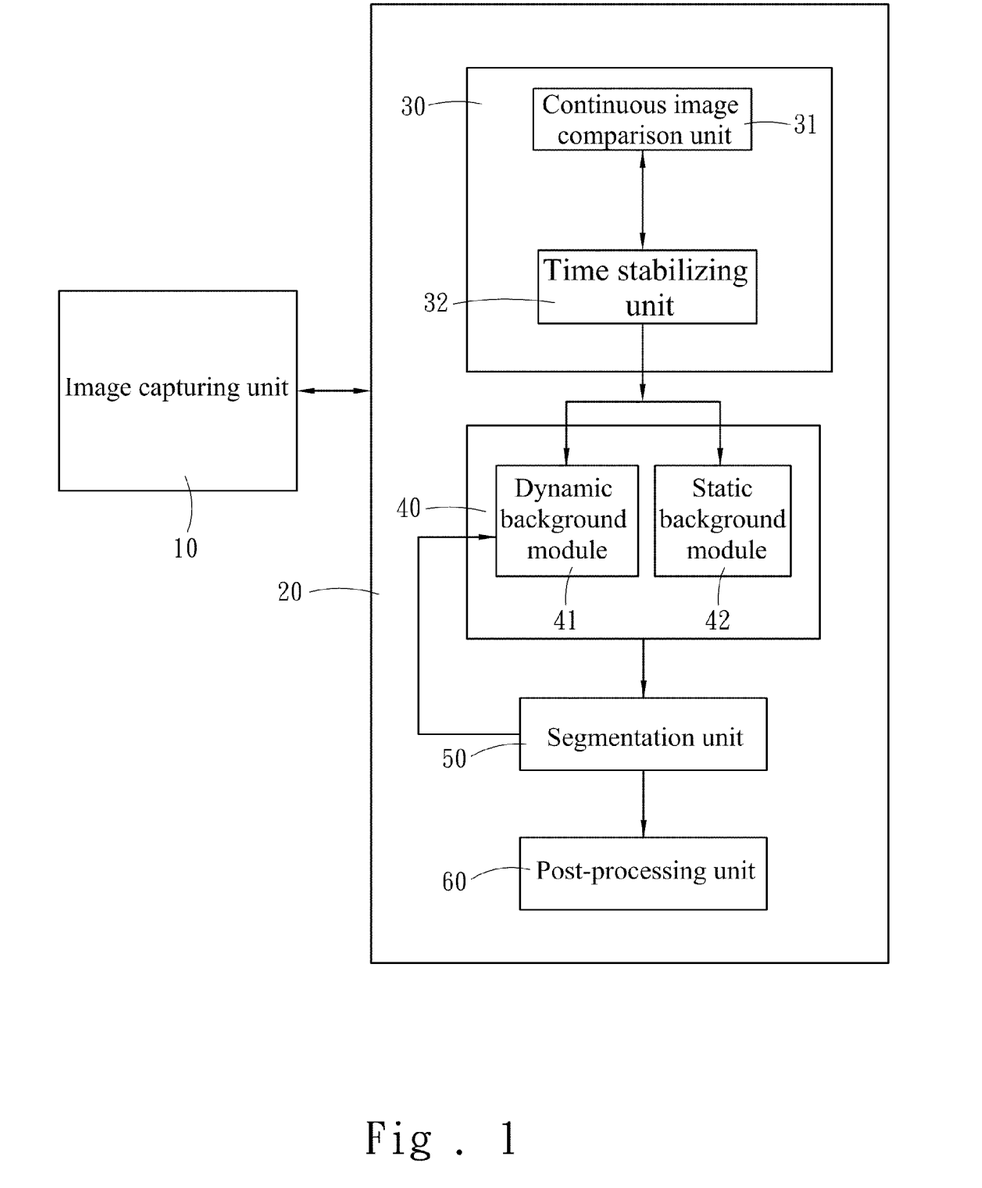
FIG. 1 is a schematic view of the intelligent monitoring system of the invention.
Figure 2:
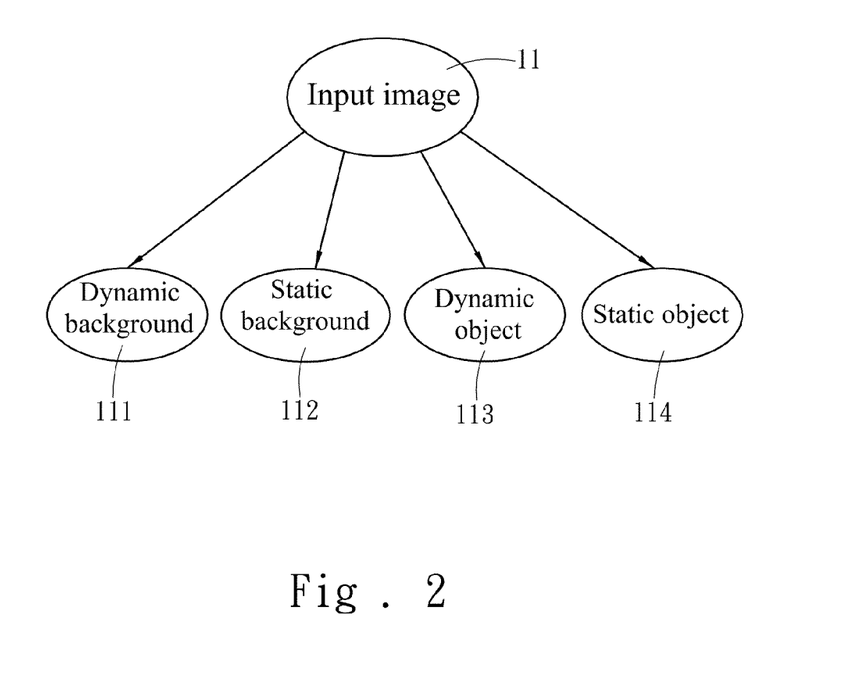
FIG. 2 is a schematic view of judgment classification of the intelligent monitoring system of the invention.

Please refer to FIGS. 1 and 2 for the system schematic view and judgment classification of the invention. The invention receives at least one input image 11 consisting of a plurality of pixels (not shown in the drawings) transmitted from an image capturing unit 10 and performs judgment. It includes a host 20, an intelligence judgment machine (IJM) 30, a continuous image comparison unit 31, a time stabilizing unit 32, a background module 40, a segmentation unit 50 and a post-processing unit 60. The image capturing unit 10 is a monitor and connected to the host 20. The IJM 30, background module 40, segmentation unit 50 and post-processing unit 60 are located in and connected to the host 20. The continuous image comparison unit 31 and the time stabilizing unit 32 are located in and connected to the IJM 30. The background module 40 has a dynamic background module 41 and a static background module 42.

Referring to FIG. 2, the input image 11 is divided into a dynamic background 111, a static background 112, a dynamic object 113 and a static object 114. The static background 112 and the static object 114 are transmitted to the static background module 42 and saved. The dynamic background 111 and the dynamic object 113 are transmitted to the dynamic background module 41 and saved. The number of the dynamic object 113 saved in the dynamic background module 41 is three times of the number of the static object 114 saved in the static background module 42, the background module 40 transmits to the segmentation unit 50 to segment the image. The segmental images are transmitted to the dynamic background module 41 and the post-processing unit 60 to facilitate judgment and post-processing of the input image 11.

Figure 3:
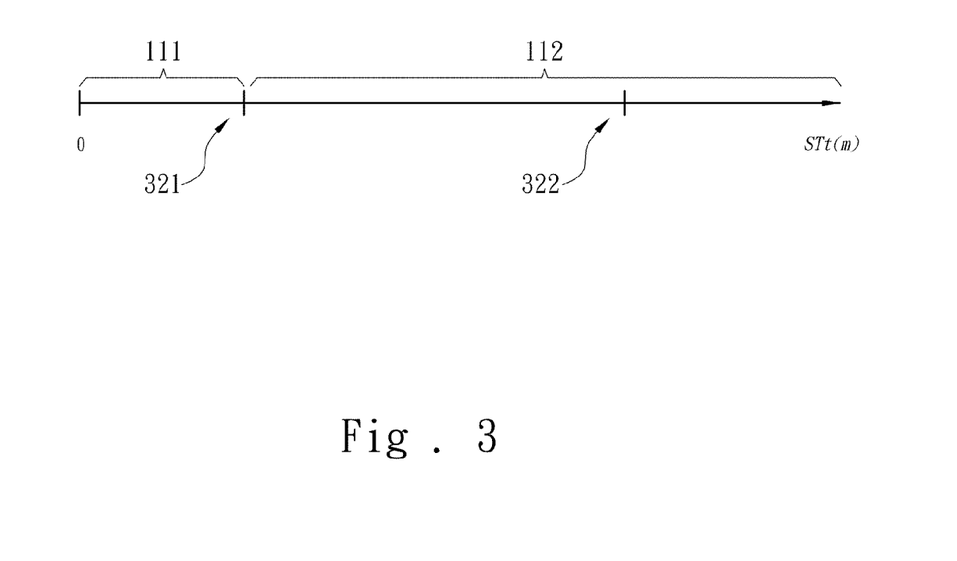
FIG. 3 is a schematic view of timeline of the intelligent monitoring system of the invention.

Also refer to FIG. 3 for the timeline of the invention. The pixels of the input image 11 at time t and location m are named Xt(m), which consists of k components. As shown by the equation (3-1) below, if a three-dimensional color space is adopted, k equals to 3; if a grey scale is adopted, k equals to 1.

$$x_t(m) = (x_t^{c1}(m), x_t^{c2}(m), \ldots, x_t^{ck}(m)) \quad (3-1)$$

The continuous image comparison unit 31 defines a continuous image variation value (TDMt(m)) to indicate a variation degree among continuous images, and also defines a threshold value Th_D to compare variations of the pixels. As shown in the equation (3-2) below, the pixels of the input image 11 at time t and location m are named $X_t(m,)$, while the pixels of the input image 11 at time t−1 and location m are named $X_{t-1}(m,)$, when the variation is smaller than the threshold value Th_D, the continuous image variation value (TDMt(m)) is 0, otherwise, is 1.

$$TDM_t(m) = \begin{cases} 0 & \text{if} |x_t^c(m) - x_{t-1}^c(m)| \le \text{Th\_D} \\ 1 & \text{otherwise} \end{cases} \quad (3-2)$$

Also referring to FIGS. 1, 2 and 3, the time stabilizing unit 32 gives STt(m) to the pixels to represent time. If the continuous image variation value (TDMt(m)) is 0, STt(m) is STt(m)+1; if the continuous image variation value (TDMt(m)) is 1, it means that changes happened to the pixels, then STt(m) is 0, as shown by the equation (3-3) below:

$$ST_t(m) = \begin{cases} ST_{t-1}(m) & \text{if} \quad TDM_t(m) = 0 \\ 0 & \text{if} \quad TDM_t(m) = 1 \end{cases} \quad (3-3)$$

As the time stabilizing unit 32 has a plurality of time threshold values (not shown in the drawings), defined a first time threshold value as (Th_ST1) 321 and a second time threshold value as (Th_ST2) 322, and set (Th_ST1) 321< (Th_ST2) 322, and (Th_ST1) 321 is ⅓ of (Th_ST2) 322, the relationship between STt(m) and (Th_ST1) 321 can determine whether the pixels is to be classified as the dynamic background 111 or the static background 112.

When STt(m) reaches the first time threshold value (Th_ST1) 321, the input image 11 could be either the static object 114 or the static background 112. Hence when the information of the input image 11 stored in the static background module 42, and the greater the value of STt(m) becomes, the pixels becomes more stable, and the static object 114 is more likely to become the static background 112.

When STt(m) is between the first time threshold value (Th_ST1) 321 and the second time threshold value (Th_ST2) 322, it means that the static background 112 is built gradually. Judged by the invention, and classified as the static object 114 and incorporated with the pixel area value of the static object 114, the static object 114 can be targeted. Incorporating with the second time threshold value (Th_ST2) 322, judgment of the static object 114 can be made.

Thus, when the static object 114 stays at the input image 11 for a duration exceeding an expected value preset by users, a corresponding process set by the users will be generated, such as alert, alarm or calling police. If the static object 114 is a suspected article, an alarm or calling police is issued. If it is an ordinary article uninterested to the users, it is updated to become the static background 112.

When STt(m) is smaller than the first time threshold value (Th_ST1) 321, although the continuous image variation value (TDMt(m)) is 0, to judge whether the pixels are dynamic object 113 or the dynamic background 111 is still not possible; but through observation and inference, the possibility of being the dynamic background 111 is highest, because by observing the dynamic background 111 (such as swaying of the tress leaves, rippling of water or the like) the frequency of swaying or rippling is quite high, hence STt(m) of the tree leaves or water ripples is at a shorter interval than the one generated by people walking. Thus given a smaller STt(m), and the continuous image variation value (TDMt(m)) being 1, based on the pixel data of the input image 11 the condition is sufficient to judge whether the dynamic background 111 exists. To avoid erroneous judgment, two more judgment conditions ought to be added to differentiate the static object 114 and the dynamic background 111. A candidate of the dynamic background 111 can be decided once any one of the two judgment conditions is met.

The first judgment condition is time interval. When STt(m) is too low, namely STt(m) is smaller than the first time threshold value (Th_ST1) 321, the IJM automatically clears the data. If data clearing is repeated frequently, classification of the dynamic background 111 is made.

The second judgment condition is the area size of the pixels of the dynamic object 113. If the area of the dynamic object 113 is smaller than a preset value, the condition is met.

In the event that the above two judgment conditions are met, the pixels of the current input image 11 are saved in a temporary dynamic background (not shown in the drawings). If the appearing frequency is excessive, the temporary dynamic background is defined as the dynamic background 111.

Figure 4:
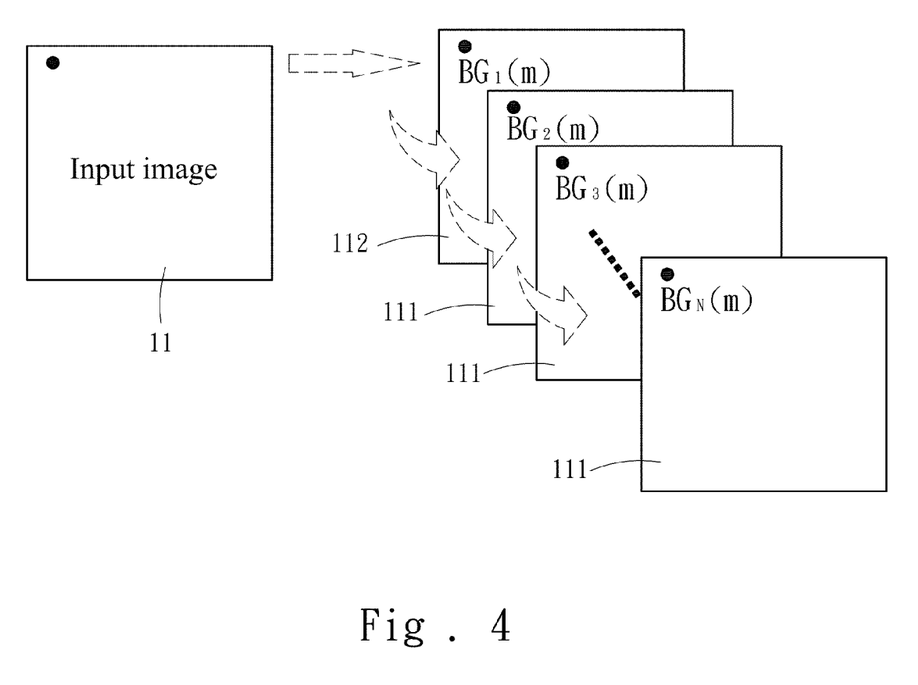
FIG. 4 is a schematic view of background update of the intelligent monitoring system of the invention.

Also refer to FIG. 4 for update of the background. The pixels of the input image 11 are compared with the background module 40 of each layer by applying the principle of Euclidean distance. Assumed that there are two points a=[a1, a2, . . . , ad] and b=[b1, b2, . . . , bd] in a d dimension space, the Euclidean distance can be obtained by the equation (3-4) below:

$$dist(a, b) = \sqrt{\sum_{1}^{d} (a_t - b_t)^2} \quad (3\text{-}4)$$

Then the space distance of the two points of the pixels can serve as the comparison condition. Given a point BG1(m) on the static background 112, points BG2(m) . . . BGN(m) belong to the dynamic background 111. When comparison of the pixels of the input image 11 matches, the information saved in the background module 40 are updated proportionally.

The updated background information is transmitted to the segmentation unit 50 and the post-processing unit 60 to perform image segmentation and post-processing operations. The segmental images are sent respectively to the dynamic background module and the post-processing unit, and are monitored continuously through setting of the IJM 30.

Figure 5:
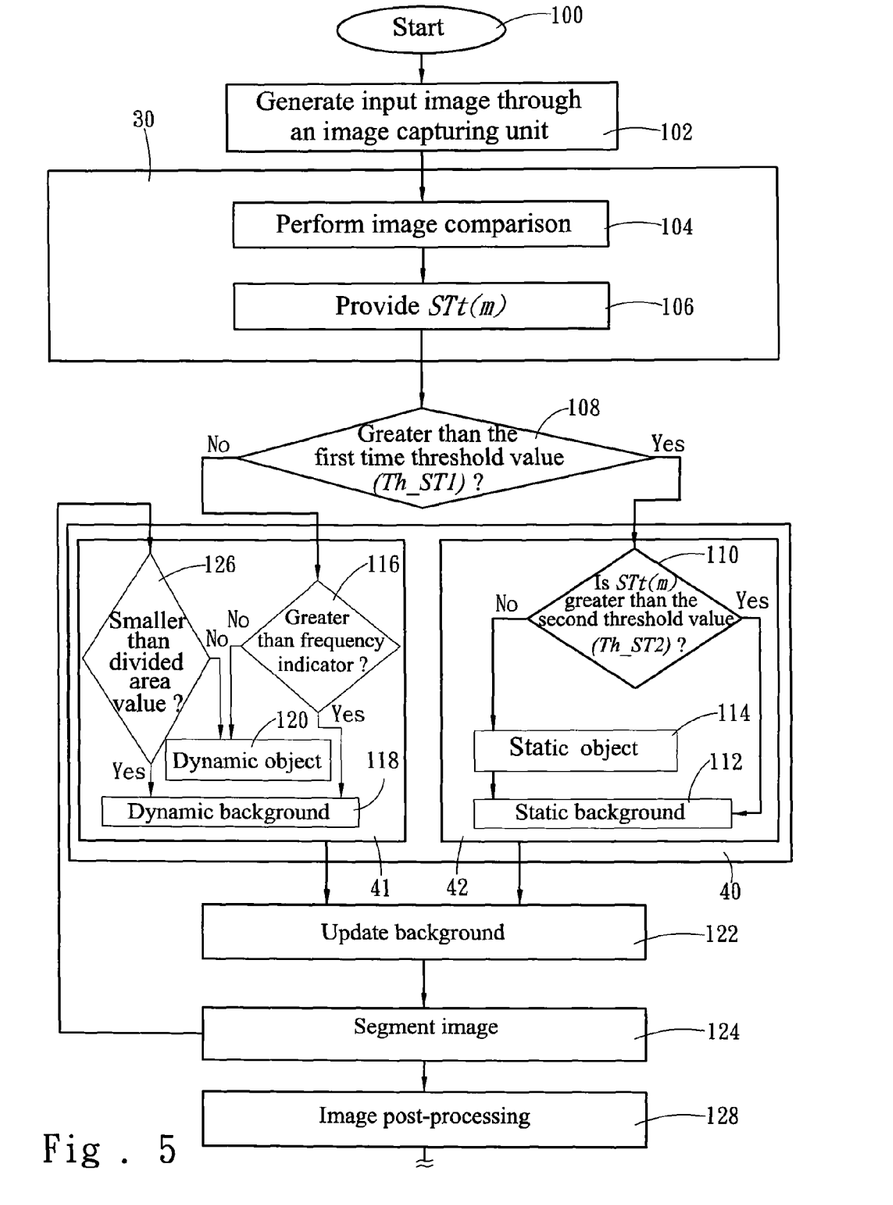
FIG. 5 is the flowchart of the intelligent monitoring system of the invention.

Refer to FIG. 5 for the flowchart of the invention. Steps 100 and 102: Start process, and the image capturing unit 10 generates the input image 11; step 104: the input image 11 is transmitted to the continuous image comparison unit 31 which has the threshold value Th_D to be compared with the input image 11;

Step 106: the compared input image 11 is transmitted to the time stabilizing unit 32 which provides STt(m); As the time stabilizing unit 32 has the first time threshold value (Th_ST1) 321 and the second time threshold value (Th_ST2)322, step 108: when STt(m) is greater than the first time threshold value (Th_ST1)321, transmit to the static background module 42 and set a temporary static background (not shown in the drawings) and a temporary static stabilizing time (not shown in the drawings);

Step 110: when STt(m) is greater than the second time threshold value (Th_ST2)322, classify the static background 112 at step 112; when STt(m) of another pixel is not greater than the second time threshold value (Th_ST2)322, proceed step 114, and classify the static object 114 and proceed image monitoring, learning or issue alarm.

Step 108: when STt(m) is smaller than the first time threshold value (Th_ST1)321, proceed step 116: transmit the pixel to the dynamic background module 41; as the IJM 30 has a preset frequency indicator and a segmental area value, when the IJM 30 automatically clears the pixel at a frequency higher than the frequency indicator, the pixel is classified as the temporary dynamic background at step 118, and the pixel being automatically cleared is given a counter (not shown in the drawings); the temporary dynamic background has a set frequency threshold value (not shown in the drawings); when the number in the counter is greater than the frequency threshold value, the temporary dynamic background is defined as the dynamic background 111. In the event that the automatic clearing frequency of the pixel is lower than the frequency indicator, proceed step 120: classify the dynamic object 113 and proceed image monitoring, learning or issue alarm.

After the background information is judged and classified, enter step 122: by means of the principle of Euclidean distance, process in each background information, and update the background according to the alteration ratio. Get information after the background has been updated, and transmit to step 124 to segment the image through the segmentation unit 50; then transmit respectively to steps 126 and 128.

Step 126: when the area value of the pixel is smaller than the set segmental area value, it becomes the dynamic background 111 at step 118 to update the background module 40 timely. If the area value of the pixel is greater than the set segmental area value, proceed step 120.

Step 128: the segmental image data is transmitted to the post-processing unit 60 to perform image post-processing to facilitate image integration and identification.

Figure 6:
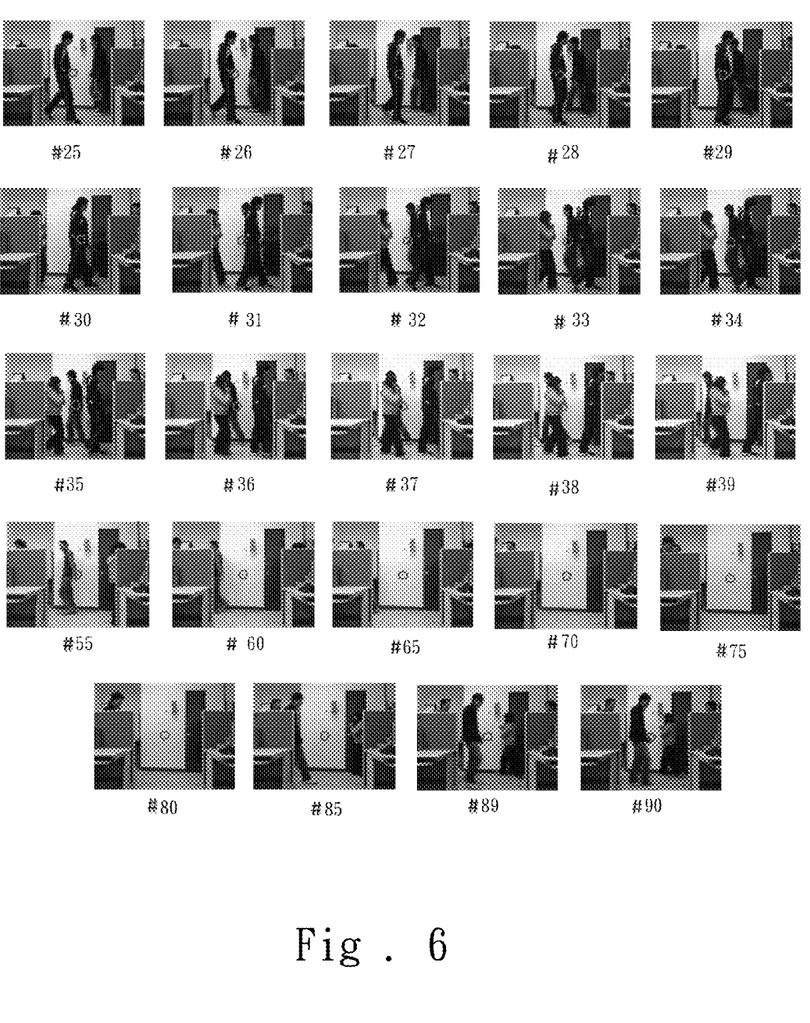
FIG. 6 is actual images at different time periods according to the intelligent monitoring system of the invention.

Refer to FIGS. 3 and 6 for the timeline and the actual images at different time periods. A scene of people walking frequently is captured. A selected location (120, 240) is targeted where people pass through frequently. By observing alterations of TDM(m) of each pixel in the picture, capture a time when STt(m) exceeds the first time threshold value (Th_ST1)321, and the pixel is saved for judgment and analysis. In this embodiment, a colored RGB image is input, and the image size is 240×320.

Figure 7:
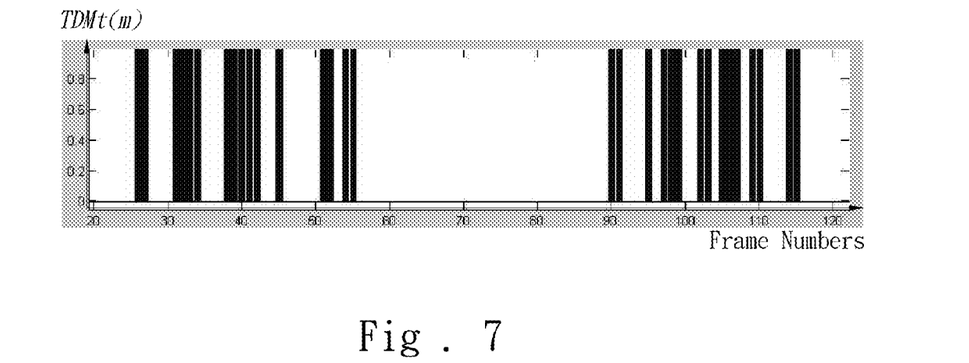
FIG. 7 is continuous image variation values (TDMt(m)) of a sampling location according to the intelligent monitoring system of the invention.

Also refer to FIG. 7 for the continuous image variation values (TDMt(m)) of a sampling location according to the intelligent monitoring system of the invention. The sampling location is at (120, 240) for images numbered from 25 to 39 in FIG. 6. The continuous image variation values (TDMt(m)) of number 28 to 30, and 35 to 37 in FIG. 6 is 0.

Figure 8:
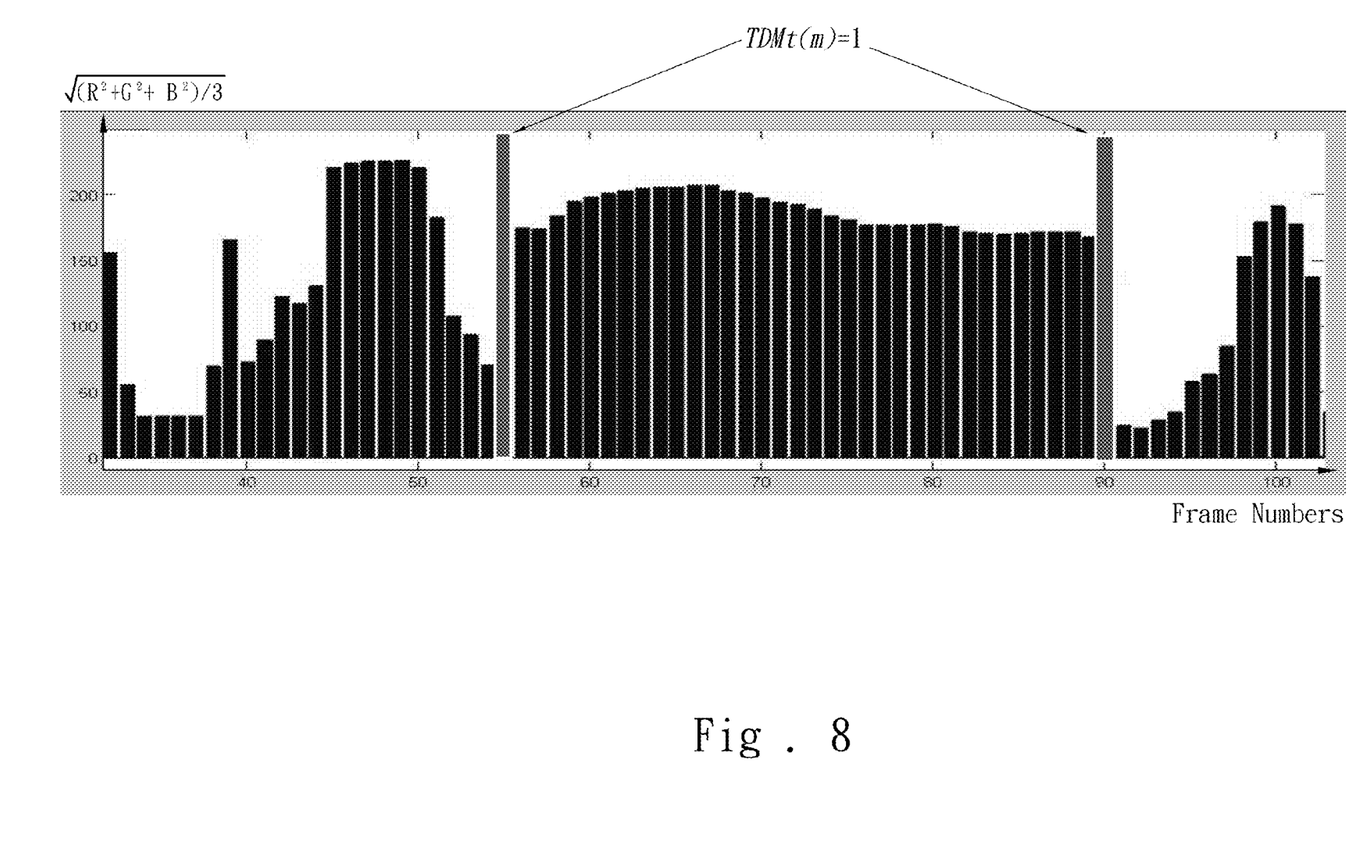
FIG. 8 is a schematic view of a static background according to the intelligent monitoring system of the invention.

Refer to FIGS. 3, 6 and 8 for the static background of the invention. Picture #55 in FIG. 6 has continuous image variation value (TDMt(m)) of 1. Then the pictures thereafter until #70 has continuous image variation values (TDMt(m)) of 0. Meanwhile STt(m) is greater than the first time threshold value (Th_ST1)321. Hence the pixel is saved as the temporary static background until the image #90 which has the continuous image variation value (TDMt(m)) of 1. Then the temporary static background serves as the background data, and STt(m) is saved and set as the temporary static stabilizing time. Not Only the color information and time are saved. Thus there are not too much processing amount and memory space being wasted.

When STt(m) is between the first time threshold value (Th_ST1)321 and the second time threshold value (Th_ST2) 322, STt(m) is compared with the temporary static stabilizing time. If STt(m) is greater than the temporary static stabilizing time, the old temporary static background and the temporary static stabilizing time are replaced to become the current temporary static background and the temporary static stabilizing time. By means of such a technique, the image being built is more reliable and like the actual background. When STt(m) is increased to the second time threshold value (Th_ST2)322, it does not increase anymore, as a stable background is established. Thereafter the second time threshold value (Th_ST2)322 serves as the condition of background update.

Figure 9:
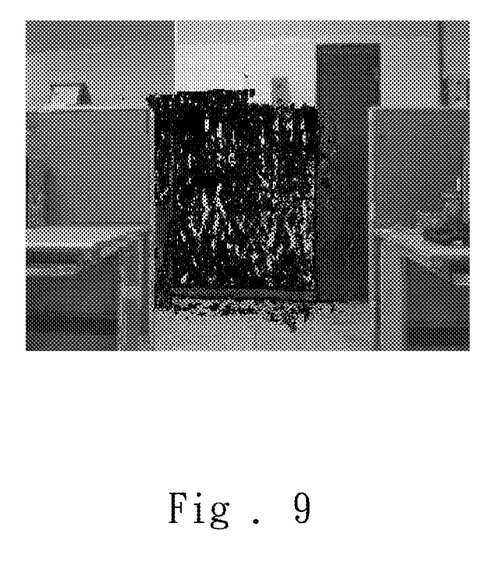
FIG. 9 is a background image captured on a selected site at National Taiwan University.

Refer to FIG. 9 for a captured background image on a selected site at National Taiwan University. Test result in FIG. 9 shows that adopted the method of Background Registration on a people moving condition, even if the image has reached picture No. 648, the background still cannot be established (the black portion).

Figure 10:
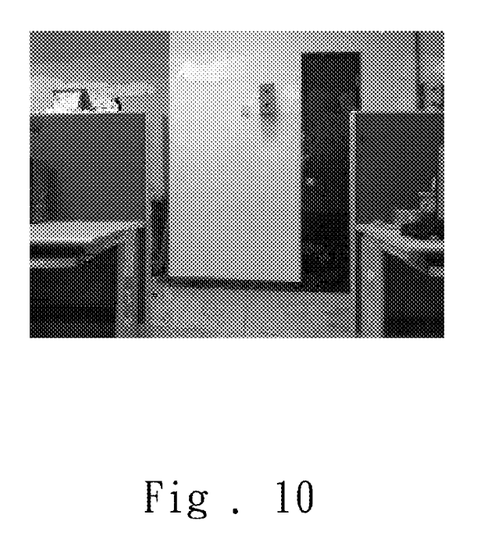
FIG. 10 is the picture of #95 background image according to the intelligent monitoring system of the invention.

Refer to FIG. 10 for the background image of image #95 according to the invention. Through the invention, complete background information is obtained less than 4 seconds (for picture #95). Hence the problem of unable to establish the background in the frequent moving condition (such as moving of people) is improved.

Figure 11:
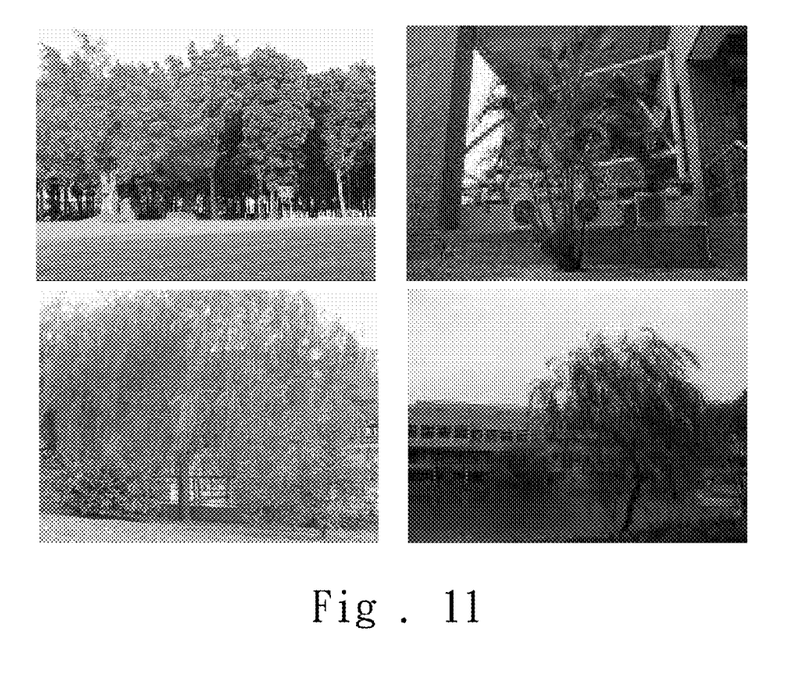
FIG. 11 is test pictures of swaying of various types of tree leaves according to the intelligent monitoring system of the invention.
Figure 12:
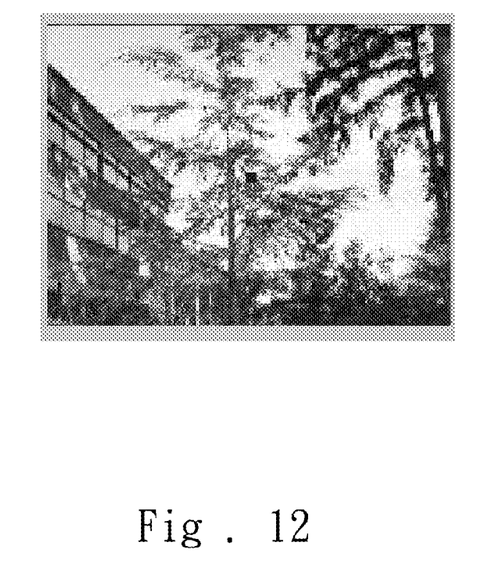
FIG. 12 is sampling spots of test pictures (60, 80) according to the intelligent monitoring system of the invention.
Figure 13:
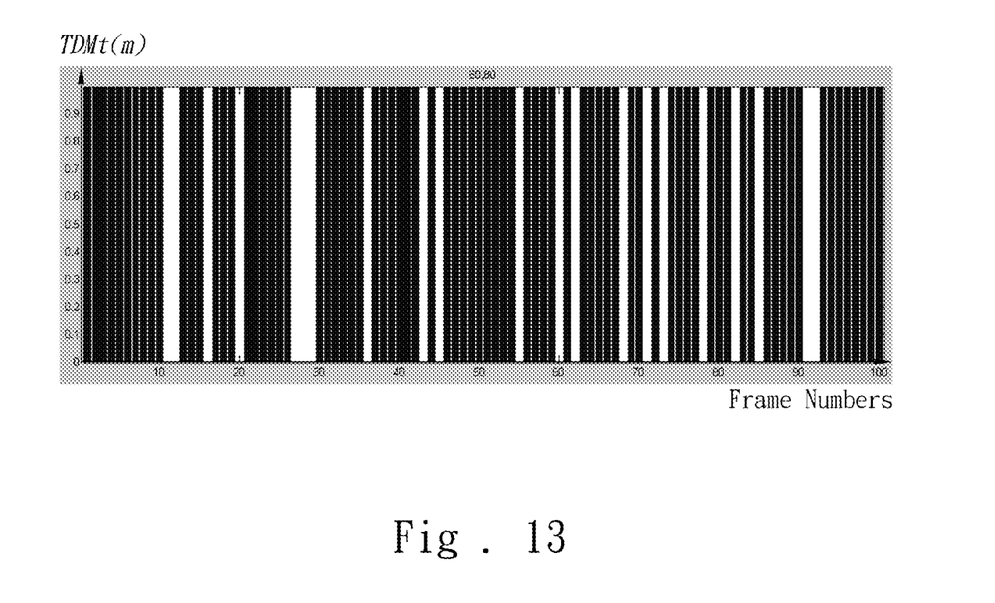
FIG. 13 is a distribution chart of local continuous image variation values (TDMt(m)) of the sampling spots (60, 80) according to the intelligent monitoring system of the invention.
Figure 14:
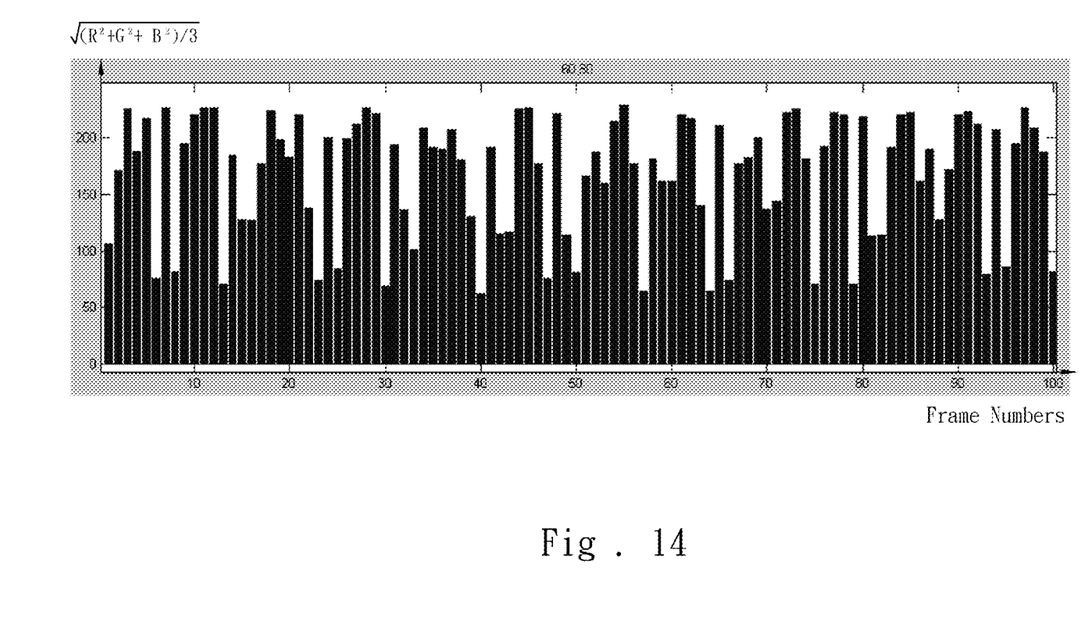
FIG. 14 is a local vector distribution chart of the sampling spots (60, 80) according to the intelligent monitoring system of the invention.

Also referring to FIGS. 11 through 14, with FIG. 11 showing tested pictures of various types of swaying tree leaves, FIG. 12 showing a sampling point (60, 80) of the tested pictures, FIG. 13 showing the local distribution of continuous image variation values (TDMt(m)) of the sampling point (60, 80), and FIG. 14 showing the local vector distribution of the sampling point (60,80). To define variation characteristics of the dynamic background 113, referring to the pictures of FIGS. 11 through 14, based on a single pixel in the pictures of swaying tree leaves, the swaying of the tree leaves appears intensively and repeatedly, and is regular based on statistics and observation for a prolonged period of time. According to the local distribution of the continuous image variation values (TDMt(m)) of the sampling point shown in FIG. 13, STt(m) of the local tree leaves is relatively small (smaller than the first time threshold valve (Th_ST1)321). Namely, one continuous image variation value (TDMt(m)) of 1 exists for a small interval. Meanwhile, the input image 11 of the tree leaves is defined as the dynamic object 113. The allocated area in FIG. 14 is the value corresponding to the continuous image variation value (TDMt(m)). In such a condition, the dynamic object 113 could be the dynamic background 111 wanted. Also referring to FIG. 5, add two more judgment conditions, namely the frequency indicator and the segmentation area value to differentiate the dynamic object 113 and the dynamic background 111. Thus when these two judgment conditions are met, the input image 11 is saved in a temporary dynamic background.

Figure 15:
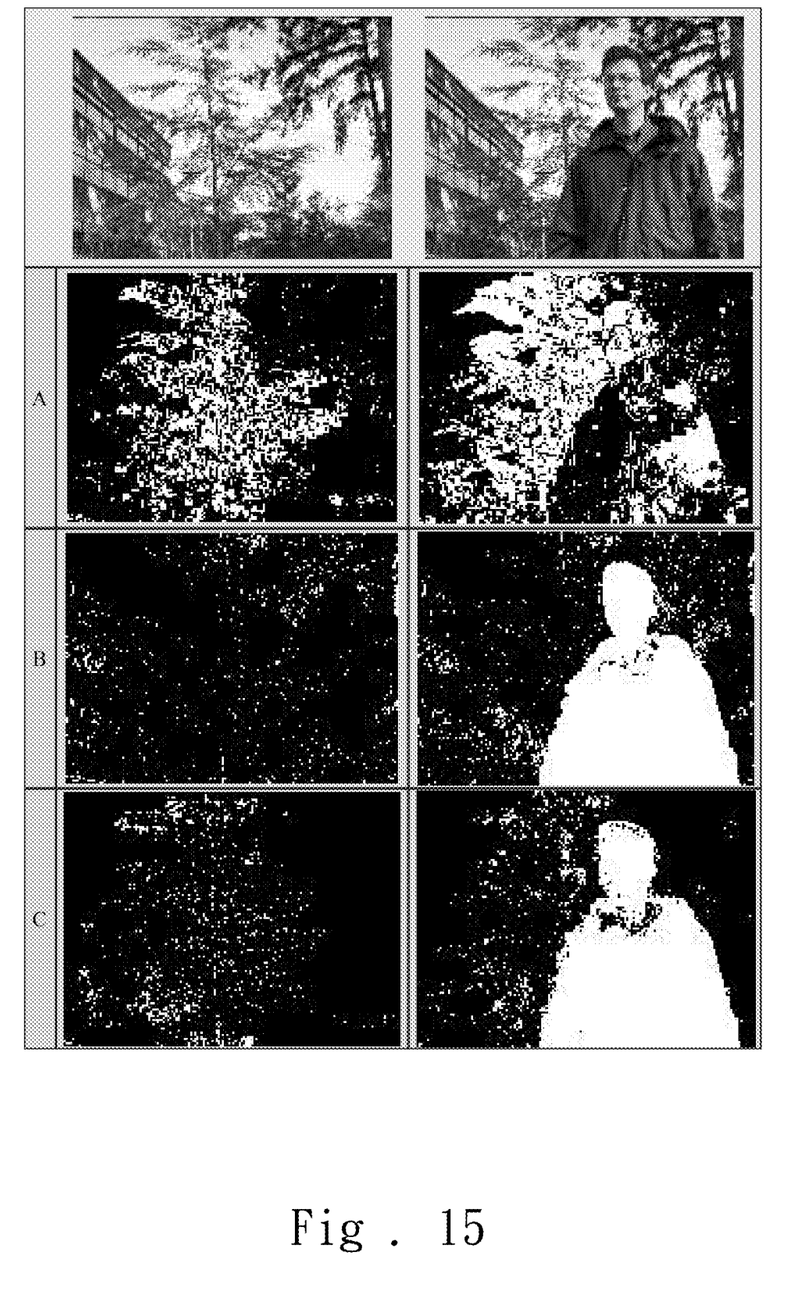
FIG. 15 is Benchmark picture segmentation comparisons according to the intelligent monitoring system of the invention.
Figure 16:
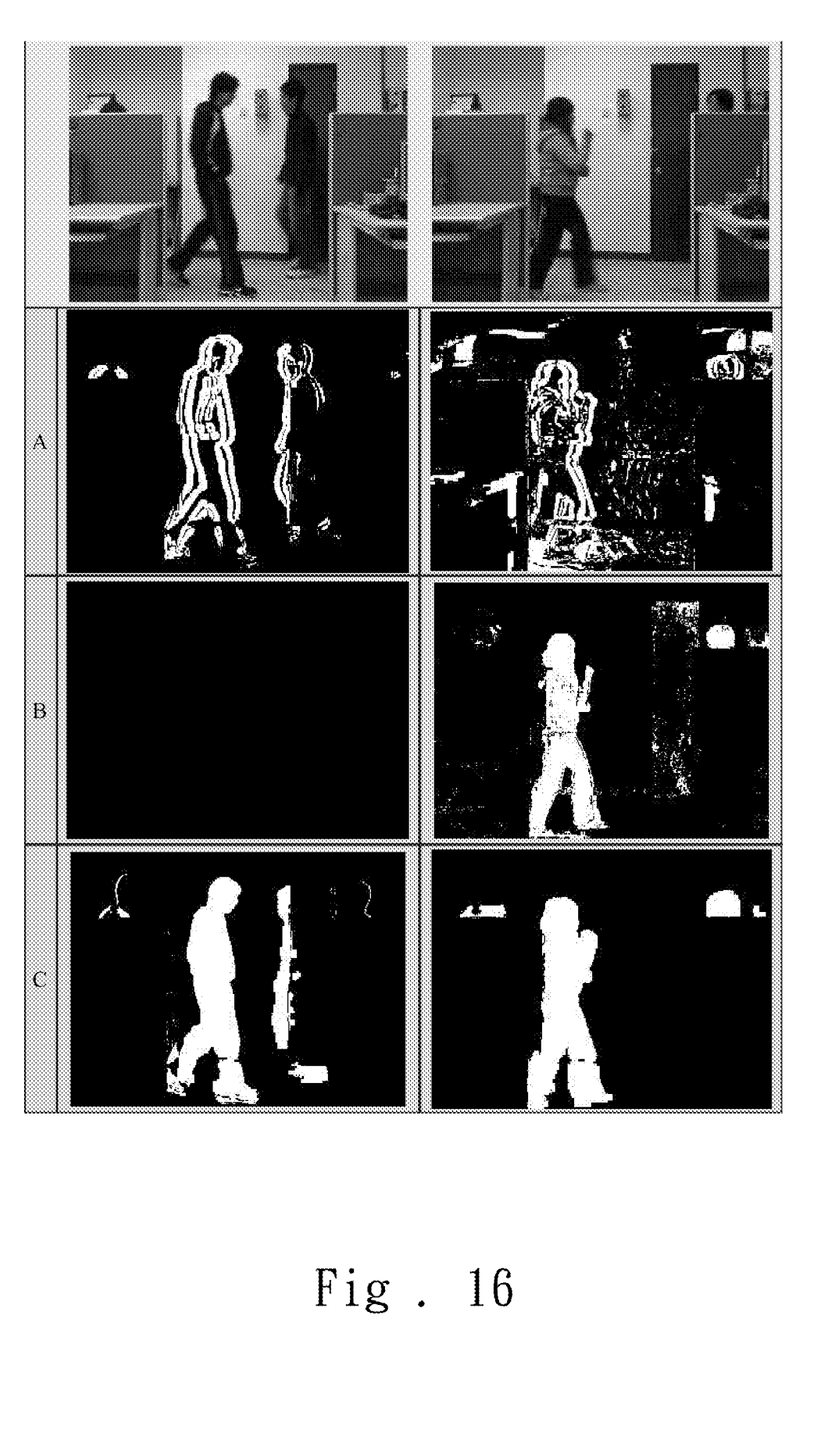
FIG. 16 is picture segmentation comparisons of moving people according to the intelligent monitoring system of the invention.

Also refer to FIGS. 15 and 16 for Benchmark picture segmentation comparison and picture segmentation comparison of moving people according to the intelligent monitoring system of the invention. The first row is input test images, second row (A) is the method provided by National Taiwan University, third row (B) adopts CodeBook method, and fourth row (C) adopts the method of the invention. In FIG. 15, the segmentation results of the invention and the CodeBook method are about the same, but the invention consumes much less memory and processing amount. Noise also improves greatly after post-processing. In FIG. 16, the first column is taken from picture No. 25 in FIG. 6. Adopted CodeBook approach, saving and training of the background are still under the processing stage. Hence there is no output in the first frame of (B) in FIG. 16, while the background has been updated in the invention, as shown in (C) of FIG. 16.

As a conclusion, the invention can rapidly establish reliable background information in a complex image environment to allow users to perform monitor according to wanted image characteristics, and do post-processing for the monitored images, such as zooming, identifying, capturing or surveillance of actions, and can transfer uninterested image information to become dynamic background or static background. Therefore, through the images occurrence of abnormal conditions can be known and alarm can be generated to allow users to take responsive actions timely.

What is claimed is:

1. An intelligent monitoring system for establishing reliable background information in a complex image environment to receive at least one input image consisting of a plurality of pixels from an image capturing unit and perform judgment, comprising:
    a host connecting to the image capturing unit;
    an intelligence judgment machine connecting to the host;
    a continuous image comparison unit located in the intelligence judgment machine and connected therewith to compare difference of the continuous input images with a threshold value; and
    a time stabilizing unit which is located in the intelligence judgment machine and connected therewith and has a plurality of time threshold values and provides a time value to the input image, wherein the time value is equal to a duration of a condition that the difference of the continuous input images is smaller than the threshold value;
    wherein the intelligence judgment machine classifies the input image as a static background, a static object, a dynamic object and a dynamic background by comparing the time value of the input image with the plurality of time threshold values and outputs to a background module, and saves the static background and the static object in a static background module and saves the dynamic background and the dynamic object in a dynamic background module.

2. The intelligent monitoring system of claim 1, wherein the background module is connected to a segmentation unit which segments image data of the background module, the segmental image data being transmitted to a post-processing unit and the dynamic background module to process judgment, the dynamic background module and the time stabilizing unit differentiating the dynamic object and the static object.

3. The intelligent monitoring system of claim 2, wherein the dynamic background module saves the image information of the dynamic background and the dynamic object, the number of the dynamic object being multiple times of the number of the static object saved in the static background module.

4. The intelligent monitoring system of claim 3, wherein the number of the dynamic object is three times of the number of the static object saved in the static background module.

5. The intelligent monitoring system of claim 1, wherein the time threshold values are divided into a first time threshold value and a second time threshold value that are preset by users, the first time threshold value being smaller than the second time threshold value.

6. The intelligent monitoring system of claim 5, wherein the first time threshold value is ⅓ of the second time threshold value.

7. The intelligent monitoring system of claim 5, wherein the static background module saves a temporary static background and a temporary static stabilizing time when the time value is greater than the first time threshold value.

8. The intelligent monitoring system of claim 7, wherein replacement to another temporary static background takes place when the time value of another pixel is greater than the temporary static stabilizing time.

9. The intelligent monitoring system of claim 5, wherein the static background is formed when the time value is equal to the second time threshold value.

10. The intelligent monitoring system of claim 5, wherein the intelligence judgment machine clears the data of the pixels and sets a frequency indicator and a segmentation area value when the time value is smaller than the first time threshold value, the pixels being defined as the dynamic background when the frequency of automatic clearing the pixels by the intelligence judgment machine is greater than the frequency indicator and the pixel area value is smaller than the segmentation area value, and a temporary dynamic background is saved in the dynamic background module and the pixels are provided with a counter.

11. The intelligent monitoring system of claim 10, wherein the temporary dynamic background has a frequency threshold value, the temporary dynamic background being defined as the dynamic background when the number in the counter is greater than the frequency threshold value.

12. The intelligent monitoring system of claim 1, wherein the image capturing unit is a monitor.

* * * * *